United States Patent Office 3,329,650
Patented July 4, 1967

3,329,650
CHEMICAL COMPOSITION AND PROCESS
Jerry R. Albin and James R. Wolfe, Jr., Wilmington, Del., assignors to E. I. du Pont de Nemours and Company, Wilmington, Del., a corporation of Delaware
No Drawing. Filed July 29, 1963, Ser. No. 298,432
9 Claims. (Cl. 260—41.5)

This invention relates to new mineral and/or carbon black loaded chain-saturated sulfur-curable hydrocarbon copolymer compositions exhibiting an improved cure rate and to the process of obtaining this result with these compositions.

Copolymer compositions containing mineral or carbon reinforcement and curable to elastomeric vulcanizates are of great commercial importance today for use in a wide variety of applications. Some of the outstanding new polymeric materials of commercial promise include the chain-saturated alpha-olefin hydrocarbon copolymers, in particular the sulfur-curable types such as are described in U.S. Patents 2,933,480 and 3,000,866. Although excellent vulcanizates of loaded compositions containing these latter polymeric materials can be obtained with existing formulations, the cure times required are undesirably long for certain applications such as wire coating. Rapid satisfactory cures of mineral-loaded stocks, such as clay stocks, have been particularly difficult to obtain.

It is therefore an object of this invention to provide an improved process for sulfur curing of certain loaded polymeric compositions. Another object of the present invention is to provide a process for improving the cure rate of mineral and/or carbon black reinforced chain-saturated sulfur-curable hydrocarbon copolymer compositions. A further object of the present invention is to provide new reinforced chain-saturated hydrocarbon copolymer compositions which exhibit improved sulfur-curability. A still further object of the present invention is to provide these compositions having an improved sulfur cure rate. And still another object is to provide new polymeric compositions which are sulfur curable and especially suited for wire and cable coating applications. And a still further object of the present invention is to obtain the foregoing objects with other curing systems such as the quinoid curing system. Other objects will appear hereinafter.

These and other objects of the present invention are accomplished, in part, by the new composition comprising a chain-saturated hydrocarbon copolymer having side chains containing carbon-to-carbon double bonds, at least one reinforcing material selected from the group consisting of mineral filler and carbon black, a curing system, preferably a sulfur curing system, and an adjuvant amount of an organic isocyanate having at least three isocyanato groups. The heart of the present invention is the use of this critical class of organic polyisocyanates in this environment.

The improved process of the present invention therefore resides in curing the composition containing the above described copolymer, reinforcing material, and curing system in the presence of at least one member of the class of polyisocyanates just defined and used in an amount to give an adjuvant effect. The resultant vulcanizate exhibits an extraordinary improvement in strength properties in comparison with the strength properties of like stocks cured similarly and in the absence of the polyisocyanate. This result is entirely unexpected because the polyisocyanates used herein are not curing agents for the copolymer gum stocks.

For example, an ethylene/propylene/1,4-hexadiene copolymer, compounded with calcined clay and vulcanized with a sulfur curing system in the presence of an organic polyisocyanate in accordance with the present invention, developed a modulus at 300% extension of 705 p.s.i. after a 5-minute cure at 160° C.; in comparison, the same stock cured for 15 minutes in the absence of the polyisocyanate had a modulus of only 410 p.s.i. Thus, in one-third the time a vulcanizate having almost twice the modulus was obtained by following the present invention.

For another comparison, ethylene/propylene/1,4-hexadiene copolymer stocks loaded with blanc fixe were used. The conventional stock after a 15-minute sulfur cure at 160° C. had a modulus at 300% extension of 240 p.s.i.; the same stock, additionally containing the polyisocyanate, had a modulus of 500 p.s.i. after only 5 minutes curing time.

In still another illustration, the same ethylene copolymer, loaded with magnesium silicate and cured with a sulfur curing system for 15 minutes in a conventional manner at 160° C., had a 300% modulus of 520 p.s.i.; in contrast, the same stock additionally containing a polyisocyanate, had a modulus of 1280 at only 5 minutes cure at 160° C.

The improved curing is not only obtained during press cures but also results during rapid cures with the heat provided by high pressure steam. For example, the same ethylene copolymer stock loaded with calcined clay and sulfur-cured for 3 minutes with 225 p.s.i. steam, gave a vulcanizate having a 300% modulus of 290 p.s.i.; in contradistinction, the same stock additionally containing a polyisocyanate displayed a modulus at 300% extension of 450 p.s.i. after only a 1-minute cure time. The adjuvant effect is also obtained when quinoid curing systems are employed to vulcanize these loaded stocks.

The polyisocyanates employed in the above experiments all contained at least three isocyanato groups. As will be shown in the examples, little or no improvement in vulcanizate properties are obtained when diisocyanates are employed. Of the suitable isocyanates containing at least three isocyanato groups, these NCO-groups are preferably joined directly to aromatic rings; however, they may be joined through aliphatic alkylene groups. Representative examples of suitable organic isocyanates include: 2,4,4'-triisocyanatodiphenylether, p,p',p''-triisocyanatotriphenylmethane; and 5-methyl-2,4,4'-triisocyanatodiphenylmethane. A particularly preferred class of promoters corresponds to the formula

where Q and Q' are aromatic hydrocarbon radicals, $n$ is the integer 2 or 3 and the ($CH_2$—Q'—NCO) groups, in excess of one, are attached to a Q' radical, e.g.

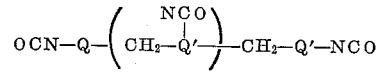

These compounds are described in U.S. Patent 2,683,730. A representative example (PAPI) is described in Example 1.

The copolymers which can be employed in the present invention are the normally solid copolymers of at least one alpha-monoolefin and at least one non-conjugated hydrocarbon diene. The alpha-monoolefins can be represented by the structure R—CH=$CH_2$ where R is H or $C_1$–$C_{16}$ alkyl, preferably straight chained. Representative examples of useful alpha-monoolefins having the structure R—CH=CH include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Representative dienes include $C_5$–$C_{22}$ open-chain compounds of the formula

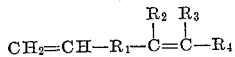

wherein $R_1$ is an alkylene radical and $R_2$, $R_3$, and $R_4$ are independently selected from the group consisting of hydrogen and alkyl radicals; $R_4$ is preferably alkyl. Examples of these dienes include:

1,4-hexadiene;
1,9-octadecadiene;
6-methyl-1,5-heptadiene;
7-methyl-1,6-octadiene;
11-ethyl-1,11-tridecadiene;
9-ethyl-1,9-undecadiene;
7-ethyl-1,7-nonadiene;
8-propyl-1,8-undecadiene;
8-ethyl-1,8-decadiene;
10-ethyl-1,9-dodecadiene;
12-ethyl-1,12-tetradecadiene;
13-n-butyl-1,12-heptadecadiene;
15-ethyl-1,15-heptadecadiene;
1,5-hexadiene; and
1,4-pentadiene.

Representative cyclic non-conjugated dienes include: dicyclopentadiene; 5-alkenyl-2-norbornenes; 5-methylene-2-norbornene; 2-alkyl-2,5-norbornadienes; cyclopentadiene; and 1,5-cyclooctadiene.

Representative examples of copolymers made from these alpha-monoolefins and the above-described non-conjugated dienes and their preparation are given in U.S. Patents 2,933,480; 3,000,866; 3,063,973; 3,093,620; and 3,093,621. When cyclic non-conjugated dienes are employed, it is preferred that the reaction mixture contain ethylene and at least one other alpha-monoolefin.

Preferred representative copolymers include:

ethylene/1,4-hexadiene;
ethylene/propylene/1,4-hexadiene;
ethylene/propylene/dicyclopentadiene;
ethylene/propylene/5-methylene-2-norbornene; and
ethylene/propylene/2-ethyl-2,5-norbornadiene;
ethylene/propylene/cyclopentadiene;
ethylene/propylene/1,5-cyclooctadiene.

The chain-saturated hydrocarbon copolymers can be oil extended before they are cured by the present invention. Representative suitable copolymers have Mooney (ML–4/100° C.) viscosities of at least 50, preferably higher, and inherent viscosities of 1.8 or above. The oils used are petroleum oils having a flash point of at least about 300° F. and a viscosity-gravity constant in the range of from 0.80 to 1.0, preferably 0.80 to 0.90. The particularly preferred oils have a total nitrogen base and first acidaffin content of not greater than 15% by weight as determined by the Rostler method. This method is described in Industrial and Engineering Chemistry, 41, pages 598–608, March 1949. The viscosity-gravity constant is described in the 1958 booklet "A Graphic Method for Selecting Oils Used in Compounding and Extending Butadiene-Styrene Rubbers" (Industrial Products Department, Sun Oil Company, Philadelphia, Pa., 1958). Representative oils include paraffinic oils, naphthenic, relatively aromatic, and aromatic oils. The petroleum can be introduced into the copolymer any time after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by routine experimentation by those skilled in the art. A detailed view of the major petroleum oils is given in the article entitled "Hydrocarbon Composition of Rubber Process Oils" by S. Kurtz, Jr. and C. C. Martin, India Rubber World Co., 126, No. 4, July 1952, page 495 onward.

The compositions being cured in accordance with the present invention are preferably compounded with a sulfur curing system.

The sulfur curing system employed in the present invention preferably consists of sulfur, a metal oxide and a curing accelerator. About 0.2–3.0, preferably 0.75–3.0 parts of sulfur are present for every 100 parts by weight of the copolymer. Vulcanizates of compositions containing concentrations below 0.2 part sulfur per 100 have less satisfactory moduli; concentrations above 4.0 parts are usually unnecessary. Of the metal oxides employed, ZnO and MgO are particularly preferred. Mixtures of oxides may be used. The concentration of the metal oxide is important since it, in conjunction with sulfur and accelerator, controls the ultimate state of curing. At concentrations of 3 to 10 parts by weight of metal oxide per 100 parts by weight of the copolymer, the rate and state of cure are very satisfactory. Concentrations below 2 parts per 100 are sometimes less satisfactory for developing and maintaining adequate vulcanizate properties and concentrations above 10 parts per 100 are generally unnecessary. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyldithiocarbamic acid; the piperidine salt of pentamethylene-dithiocarbamic acid; 2-mercaptothiazoline; 2-mercaptobenzothiazole; N,N-diethylthiocarbamyl-2-mercaptobenzothiazole, and 2,2'-dithiobisbenzothiazole. A representative and preferred accelerator includes tellurium diethyldithiocarbamate (1.5 parts) and tetra-methylthiuram disulfide (0.75 part). Those skilled in the art can select by routine experiments the best combinations of accelerators when curing a particular assembly. In addition to the above-described components, the novel composition may include such optional components as conventional antioxidants.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, David and Blake, published by Reinhold Publishing Corp., New York, 1937, chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099.

In addition to the above-described copolymers, curing agents, and the specified organic polyisocyanates, the composition of the present invention contains reinforcing or extending agents such as carbon black and mineral fillers. The unexpected improvement in the sulfur cure rate obtained by the process of the present invention is not obtained when these agents are absent. The type and amount of filler can be selected by those skilled in the art to suit a particular application and the customary routine experiments can be employed to determine the optimum proportion of a particular reinforcing agent to use for a particular application.

About 20 to 300, frequently 20 to 70 parts of carbon black are supplied for each 100 parts by weight of the polymer in order to obtain vulcanizates of higher modulus and tensile strength. The invention obtains the most marked improvement in the case of those blacks which provide a low order of reinforcement such as thermal blacks. However, improved results are also obtained with the better reinforcing blacks. Any of the channel blacks, such as EPC, MPC, HPC, and CC and any of the furnace blacks such as SAF, SRF, HMF, CF, HAF, and FF can be satisfactorily used.

A wide variety of mineral fillers can be employed in the present invention. Representative examples of these fillers include kaolin clay, calcined kaolin clay, magnesium silicate, blanc fixe, whiting, silica and talc. Kaolin clay and calcined kaolin clay are particularly suitable. About 20 to 300, frequently 90 to 120 parts of filler are supplied for each 100 parts by weight of the elastomer. Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate. It is not critical whether these kaolin clays are "residual" or "sedimentary" in origin; they can be produced by any conventional process such as the dry process (air flotation) or the wet process (classification in a water suspension). These clays are the clay minerals belonging to the kaolin group and have a stable non-expanding crystal lattice in which one gibbsite sheet is condensed with one silica sheet. Representative clays include kaolinite, the most important one, nacrite, dickite, and halloysite. Kaolinite has the chemical formula $Al_2O_3 \cdot 2SiO_2 \cdot 2H_2O$. It is to be understood that these kaolins generally also contain some compounds of iron, titanium, calcium, magnesium, potassium, sodium, and occasionally manganese; in kaolinites minor proportions of hydrated aluminum silicate minerals other than kaolinite may be present. In general, the molar ratio of silica to alumina in the clay is in the neighborhood of 2:1, the value for kaolinite itself.

The principal physical characteristics of the clay which are preferred for use in the present invention are: (1) a specific gravity of about 2.60; (2) a 325-mesh screen residue below about 3.5%, preferably below about 0.35%; (3) absorbed moisture content not above about 0 to 1%; (4) a particle size distribution wherein at least about 55% by weight of the particles are two microns or less in diameter; and (5) a pH (in water) of about 4.4 to 7.0, although specially prepared and treated clays may show pH values of 8.0 or higher.

Representatives "hard" and "soft" kaolins contain (by weight): 44–46% silica; 37.5–39.5% alumina; 0.5–2.0 iron oxide; and 1–2% titanium dioxide; the ignition loss of these representative clays is 13.9–14.0% by weight.

Representative commercially available kaolin clays include: Champion Clay ("hard"), Crown Clay ("hard"), Harwick Clay No. 1 ("hard"), Suprex Clay ("hard"), Alumex R ("soft"), "Hi-White R" ("soft"), McNamee Clay ("soft"), Paragon Clay ("soft"), and Polyfil F ("soft").

Clays are more particularly described in the following publications: Compounding Ingredients for Rubber, 3rd edition, 1961, Cuneo Press of New England, Cambridge, Mass., compiled by the editors of Rubber World, 630 Third Avenue, New York 17, N.Y.; Kaolin Clays and Their Industrial Uses, J. M. Huber Corp., New York, N.Y., 2nd edition, 1955; India Rubber World, 118, No. 6, New York, September 1948, pages 793–795; Clays, Their Occurrence, Properties and Uses, H. Ries, 3rd edition, John Wiley & Sons, Inc., New York, 1927; The Chemistry and Physics of Clays and Other Ceramic Materials, A. B. Searle and R. W. Grimshaw, 3rd edition, Interscience Publishers, Inc., New York, 1959; Preliminary Reports Reference Clays Materials, American Petroleum Institute Research Project 49, Columbia University, New York, January 1951, and X-Ray Identification and Crystal Structures of Clay Materials, edited by G. W. Brindley, London, 1951.

In operating the present invention, the organic isocyanate containing at least three NCO-groups (or a mixture of such isocyanates) is mixed with the copolymer stock at any time before curing begins. Since the order of addition is not critical, it is often convenient to prepare special compositions containing hydrocarbon copolymer, the polyisocyanate, and optionally a petroleum oil. The adjuvant effect is also obtained when the isocyanates are incorporated into loaded stocks which have been heat treated at temperatures between 300 to 400° F. in the presence of a heat treatment promoter, such as p-quinone dioxime. These special compositions can be used at any time thereafter; when stored, they should be kept free from isocyanate-reactable reagents such as water and organic compounds having groups bearing Zerewitinoff active hydrogen atoms (e.g. alcohols, carboxylic acids, primary and secondary amines). It is essential that both the organic polyisocyanate and the sulfur curing system be present when the curing of the hydrocarbon copolymer is started. As has been pointed out above, the organic polyisocyanates are not capable of effecting satisfactory cures of the chain-saturated hydrocarbon copolymers by themselves, and the conventional curing systems provide results which leave something to be desired. Mixing of the components of the curable composition is carried out in a conventional manner using rubber roll mills, Banbury mixers, and the like. In order to avoid premature scorch, it is preferred to mix at temperatures in the range of 75–100° F., well below the usual cure temperature.

The adjuvant effect is usually obtained by employing at least about 2 parts of the polyisocyanate for every 100 parts of the copolymer. Otherwise, vulcanizate properties tend to fall off, particularly, the modulus and the compression set. It is to be understood that there will always be a certain amount of improvement over the conventional stocks when any amount of the specified organic polyisocyanate is added but in order to gain the significant degree of improvement desired, one should add at least 0.5 part per 100 parts by weight of the organic polyisocyanate. The preferred proportions are in the range from 2 to 3 parts per hundred. Proportions above 3 parts are usable but are not necessary and increase the cost of the vulcanizate needlessly. Those skilled in the art can determine the exact amount for each organic polyisocyanate compound by means of routine experiments.

Typical sulfur-curable alpha-olefin hydrocarbon copolymer cures are described in U.S. Patent 2,933,480. Temperatures generally range between about 130 and 180° C., with about 150 to 160° C. being preferred. Cure times in a press will vary inversely with the temperature, higher temperatures requiring shorter cure times. At 160° C. cures of 5 to 30 minutes are satisfactory. The compositions may also be cured by heating with high pressure steam. Representative conditions include 15 seconds to 3 minutes at 225 lb./sq. in. pressure steam. Those skilled in the art will select the particular conditions needed for optimum results based on such considerations as the conditions recommended in the art for the particular curing agents being used, etc.

The following examples, in which parts and percents are by weight unless otherwise specified, are representative of the new compositions and process of the present invention.

EXAMPLE 1

*Copolymer A*

Copolymer A was an ethylene/propylene/1,4-hexadiene copolymer, made in tetrachloroethylene with a diisobutyl aluminum chloride/vanadium oxytrichloride catalyst in accordance with U.S. Patent 2,933,480. It exhibited a Mooney viscosity (ML-4/100° C.) of 80-90 and had the following monomer unit composition by weight: propylene, 40-45%; 1,4-hexadiene, 3.5-4.5%; the remainder being ethylene.

*Calcined clay ("Iceberg Pigment")*

The calcined kaolin clay employed had a specific gravity of 2.63 and contained 45-52% silica, and 38-44% alumina, and had an ignition loss of 0%.

*Polyisocyanate A (PAPI)*

Polyisocyanate A corresponds to the formula:

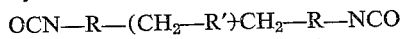

$$OCN-R-(CH_2-R')-CH_2-R-NCO$$

where R is phenylene and R' is phenylene substituted by an —NCO group. The amine equivalent is approximately 136. The number-average molecular weight (cyroscopic, benzene) is about 400. This product was made by phosgenation of a polyamine prepared by condensation of formaldehyde with aniline in the presence of hydrochloric acid. The procedure is given in the example in U.S. Patent 2,683,730.

Two stock, 1-A and 1-B, were compounded on a rubber roll mill at a temperature between about 75-100° F. according to the following recipe (given in parts by weight):

| Ingredients | 1-A | 1-B |
|---|---|---|
| Copolymer A | 100 | 100 |
| Zinc oxide | 5 | 5 |
| Calcined kaolin | 90 | 90 |
| Tetramethyl thiuram monosulfide | 1.5 | 1.5 |
| 2-mercaptobenzothiazole | 0.5 | 0.5 |
| Sulfur | 2 | 2 |
| Polyisocyanate A | 0 | 2 |

The corresponding stocks 1-A and 1-B, thereby obtained, were cured in several ways. Portions were heated in a press for 15 minutes at 160° C. and other portions of these stocks were given a one-minute cure with steam (225 lb./sq. in.). The dimensions of the slabs which were steam cured were 3 x 6 x 0.50 inches. The following data were obtained at 25° C. for the corresponding vulcanizates; stock 1-A, which is outside the present invention, is included for purposes of comparison.

VULCANIZATE PROPERTIES AT 25° C.
[Calcined clay loaded ethylene/propylene/1,4-hexadiene copolymer]

| | 1-A (control) | 1-B |
|---|---|---|
| Cured 15'/160° C.: | | |
| $M_{300}$ (p.s.i.) | 660 | 1,260 |
| $T_B$ (p.s.i.) | 1,420 | 1,575 |
| $E_B$ (percent) | 575 | 415 |
| Compression set, 22 hours, 70° C. (percent) | 30 | 22 |
| Cured 1'/225 p.s.i. steam: | | |
| M (p.s.i.) | 320 | 645 |
| T (p.s.i.) | 1,630 | 2,035 |
| E (percent) | 810 | 805 |

EXAMPLE 2

Six stocks, 2-A to 2-F, were compounded on a rubber roll mill at a temperature between 75-100° F. according to the following recipe (given as parts by weight).

| Ingredients: | Parts by weight |
|---|---|
| Copolymer A of Example 1 | 100 |
| Zinc oxide | 5 |
| High-abrasion furance black (stocks A-B only) | 50 |
| Calcined clay of Example 1 (stocks C-F only) | 120 |
| Naphthenic petroleum oil (stocks C-F only) | 40 |
| Sulfur | 3 |
| Tetramethyl thiuram monosulfide | 1.5 |
| 2-mercaptobenzothiazole (MBT) | As indicated |
| Polyisocyanate A of Example 1 | As indicated |

The resulting stocks, thereby obtained, were cured in several ways. Portions were heated in a press for 5 minutes and 15 minutes at 160° C. Other portions of these stocks were cured with steam (225 lb./sq. in.) for 1 minute and 3 minutes. The vulcanizates obtained exhibited the following data at 25° C. Stocks A, C, and E which are outside the scope of the invention, are included for comparison.

VULCANIZATE PROPERTIES
[Loaded ethylene/propylene/1,4-hexadiene copolymer]

| | HAF Black Stocks | | Calcined Clay Stocks | | | |
|---|---|---|---|---|---|---|
| | A (control) | B | C (control) | D | E (control) | F |
| MBT Used (phr.) | 2 | 2 | 0.5 | 0.5 | 2 | 2 |
| Polyisocyanate A (phr.) | 0 | 3 | 0 | 3 | 0 | 3 |
| Cured 5'/160° C.: | | | | | | |
| $M_{300}$ (p.s.i.) | 1,810 | 2,275 | 335 | 705 | 345 | 1,000 |
| $T_B$ (p.s.i.) | 3,475 | 3,640 | 1,680 | 1,285 | 1,545 | 1,485 |
| $E_B$ (percent) | 425 | 415 | 900 | 605 | 765 | 530 |
| Cured 15'/160° C.: | | | | | | |
| $M_{300}$ (p.s.i.) | 2,350 | 3,000 | 410 | 830 | 400 | 950 |
| $T_B$ (p.s.i.) | 2,705 | 3,835 | 1,710 | 1,370 | 1,520 | 1,445 |
| $E_B$ (percent) | 335 | 360 | 775 | 590 | 710 | 520 |
| Cured 1'/225 p.s.i. steam: | | | | | | |
| $M_{300}$ (p.s.i.) | 1,150 | 1,400 | 175 | 280 | 200 | 370 |
| $T_B$ (p.s.i.) | 3,630 | 3,715 | 1,000 | 1,160 | 1,220 | 1,415 |
| $E_B$ (percent) | 560 | 530 | >1,000 | >1,000 | >1,000 | 990 |
| Cured 3'/225 p.s.i. steam: | | | | | | |
| $M_{300}$ (p.s.i.) | 1,875 | 2,180 | 220 | 365 | 240 | 395 |
| $T_B$ (p.s.i.) | 3,660 | 3,625 | 1,335 | 1,530 | 1,400 | 1,650 |
| $E_B$ (percent) | 440 | 405 | 950 | 905 | 895 | 920 |

EXAMPLE 3

Mineral fillers (1) *Kaolin clay (Suprex Clay)*.—The clay employed was an air-floated "hard" kaolin clay (commercially available from the J. M. Huber Corp., New York, N.Y. as Suprex Clay) containing 44–46% silica, 37.5–39.5% alumina, 1.5–2.0% iron oxide, and 1–2% titanium dioxide by weight, the ignition loss being 13.9–14.2% by weight. The maximum moisture content was 1% by weight. The pH (in water) was 4.5–5.5. This clay has a specific gravity of 2.60, a 325-mesh screen residue of 0.17% by weight and the following particle size distribution (by weight): greater than 10 microns, 0.1%; 5–10 microns, 2.8%; 4–5 microns, 1.5%; 3–4 microns, 2.3%; 2–3 microns, 3.4%; 1–2 microns, 9.0%; 0.5–1.0 micron, 19.0%; and 0–0.5 micron, 61.9%.

(2) *Magnesium silicate*.—The magnesium silicate employed was an ultra-fine grade (commercially available from the Berkshire Chemical Co. as "Mistron Vapor") having a specific gravity of 2.75, maximum particle size of 6 microns, and a specific surface of about 20 sq.m./gram.

(3) *Chemically treated kaolin clay*.—A specially chemically treated clay was employed commercially available as "Translink 37" clay.

(4) *Blanc fixe*.—Blanc fixe is a precipitated barium sulfate in the form of an odorless, non-toxic, white powder having a specific gravity ranging within 4.40–4.50 and an oil absorption ranging between 14–21%.

(5) *Calcium carbonate (Atomite Whiting)*.—An odorless, non-toxic, dry, white powder having a specific gravity of 2.71, a pH of 9.3, and a particle size in the range of 0.5 micron to 10 microns (averaging 2.5 microns) was employed. This natural ground material is commercially available from Thompson-Weinman & Co.

(6) *Hydrated silica (Hi-Sil 233)*.—Hydrated silica, commercially available from Colombia-Southern Chemical Corp., was employed in the form of a fine white powder having a specific gravity of 1.95.

The use of mineral fillers in elastomer A stocks

Twelve stocks, A–L, were compounded on a rubber roll mill at about 75–100° F. according to the following recipe.

| Ingredients: | Parts by weight |
|---|---|
| Copolymer A of Example 1 | 100 |
| Mineral filler (see Table 1) | 120 |
| Naphthenic petroleum oil of Example 2 | 40 |
| Zinc oxide | 5 |
| Tetramethyl thiuram monosulfide | 1.5 |
| 2-mercaptobenzothiazole | 2 |
| Sulfur | 3 |
| Polyisocyanate A of Example 1 (stocks B, D, F, H, J and L only) | 3 |

Portions of the stocks were cured in a press for 5 minutes and 15 minutes at 160° C. Other portions were cured with steam (at 225 lb./sq. in. pressure) for 1 minute and 3 minutes. The table which follows gives the data obtained for measurements of the vulcanizates at 25° C.:

VULCANIZATE PROPERTIES
[Loaded ethylene/propylene/1,4-hexadiene copolymer]

| Filler | A | B | C | D | E | F | G | H | I | J | K | L |
|---|---|---|---|---|---|---|---|---|---|---|---|---|
| | Blanc Fixe | | Whiting | | HiSil 233 | | Kaolin Clay | | Mg Silicate | | Translink 37 | |
| Polyisocy. A (phr.) | 0 | 3 | 0 | 3 | 0 | 3 | 0 | 3 | 0 | 3 | 0 | 3 |
| Cured 5'/160° C.: | | | | | | | | | | | | |
| $M_{300}$ (p.s.i.) | 160 | 500 | 180 | 580 | 280 | 385 | 170 | 610 | 390 | 1,280 | 285 | 740 |
| $T_B$ (p.s.i.) | 1,080 | 1,370 | 965 | 970 | 595 | 1,220 | 720 | 1,720 | 1,585 | 1,420 | 1,140 | 1,105 |
| $E_B$ (percent) | 775 | 660 | 730 | 590 | 885 | 970 | >1,000 | 815 | 850 | 410 | >1,000 | 560 |
| Cured 15'/160° C.: | | | | | | | | | | | | |
| $M_{300}$ (p.s.i.) | 240 | 580 | 225 | 595 | 465 | 700 | 300 | 775 | 520 | 1,200 | 450 | 960 |
| $T_B$ (p.s.i.) | 570 | 1,020 | 520 | 730 | 1,415 | 2,325 | 1,835 | 2,000 | 2,050 | 1,875 | 1,635 | 1,325 |
| $E_B$ (percent) | 625 | 505 | 575 | 430 | 780 | 780 | 975 | 725 | 760 | 610 | 785 | 530 |
| Cured 1'/225 p.s.i. steam: | | | | | | | | | | | | |
| $M_{300}$ (p.s.i.) | 115 | 350 | 150 | 370 | 435 | 530 | 180 | 370 | 345 | 730 | 300 | 530 |
| $T_B$ (p.s.i.) | 1,225 | 1,440 | 1,130 | 1,180 | 1,480 | 1,990 | 1,020 | 1,670 | 1,630 | 1,690 | 1,305 | 1,570 |
| $E_B$ (percent) | 970 | 860 | 920 | 885 | 880 | 800 | >1,000 | 995 | 980 | 860 | 940 | 965 |
| Cured 3'/225 p.s.i. steam: | | | | | | | | | | | | |
| $M_{300}$ (p.s.i.) | 145 | 385 | 170 | 380 | 730 | 750 | 225 | 540 | 430 | 770 | 340 | 560 |
| $T_B$ (p.s.i.) | 1,400 | 1,510 | 730 | 1,110 | 2,025 | 2,150 | 1,570 | 1,855 | 1,940 | 1,900 | 1,510 | 1,685 |
| $E_B$ (percent) | 910 | 800 | 810 | 810 | 600 | 660 | >1,000 | 850 | 885 | 800 | 880 | 910 |

EXAMPLE 4

Three stocks, A–C, were compounded on a rubber roll mill at about 75–100° F. according to the following recipe.

| Ingredients: | Parts by weight |
|---|---|
| Copolymer A of Example 1 | 100 |
| Naphthenic petroleum oil of Example 2 | 40 |
| Calcined clay of Example 1 | 120 |
| Zinc oxide | 5 |
| Tetramethyl thiuram monosulfide | 1.5 |
| 2-mercaptobenzothiazole | 0.5 |
| Sulfur | 3 |
| Polyisocyanate A of Example 1: | |
| (A) | 2 |
| (B) | 3 |
| (C) | 4 |

Stocks thereby obtained were cured by several procedures. Portions were cured in a press for 15 minutes at 160° C. Other portions were steam cured at 225 lb./sq. in.

steam pressure for 1 minute and 3 minutes. The properties of the resulting vulcanizates as measured at 25° C. are given in the table that follows:

VULCANIZATE PROPERTIES AT 25° C.
[Calcined clay loaded ethylene/propylene/1,4-hexadiene copolymer]

|  | Stocks | | |
|---|---|---|---|
|  | A | B | C |
| Polyisocyanate A (phr.) | 2 | 3 | 4 |
| Cured 15'/160° C.: | | | |
| $M_{300}$ (p.s.i.) | 800 | 840 | 930 |
| $T_B$ (p.s.i.) | 1,580 | 1,630 | 1,410 |
| $E_B$ (percent) | 660 | 635 | 550 |
| Cured 1'/225 p.s.i. steam: | | | |
| $M_{300}$ (p.s.i.) | 270 | 310 | 360 |
| $T_B$ (p.s.i.) | 1,235 | 1,400 | 1,360 |
| $E_B$ (percent) | >1,000 | >1,000 | 990 |
| Cured 3'/225 p.s.i. steam: | | | |
| $M_{300}$ (p.s.i.) | 355 | 375 | 420 |
| $T_B$ (p.s.i.) | 1,575 | 1,680 | 1,725 |
| $E_B$ (percent) | 890 | 895 | 890 |

EXAMPLE 5

Seven stocks, A–G, were compounded on a rubber roll mill at about 75–100° F. according to the following recipe.

Ingredients: Parts by weight
- Copolymer A of Example 1 — 100
- Naphthenic petroleum oil of Example 2 — 40
- Calcined clay of Example 1 — 120
- Zinc oxide — 5
- Tetramethyl thiuram monosulfide — 1.5
- 2-mercaptobenzothiazole — 2.0
- Sulfur — 3.0
- Organic isocyanate (see table) (0 for stock C) — 3.0

The stocks obtained were cured as follows: a portion was cured for 5 and 15 minutes at 160° C. in a press; another portion was cured with 255 lb./sq. in. steam for 1 minute and 3 minutes. The properties of the resulting vulcanizates, measured at 25° C., are given in the table below. Stock C, which contains no organic isocyanate, is included for purposes of comparison and is outside the scope of the present invention. The stocks D–F which are outside the scope of the present invention, show the results obtained when other organic isocyanates are employed.

EXAMPLE 6

Copolymer B

Copolymer B was an ethylene/1,4-hexadiene copolymer containing 35.2% by weight 1,4-hexadiene monomer units and exhibiting an inherent viscosity of 1.32 (measured at 30° C. on a 0.1% by weight solution in tetrachloroethylene). This copolymer was made in tetrachloroethylene using a vanadium tris(acetylacetonate)/diisobutyl aluminum monochloride catalyst according to the general directions of the U.S. Patent 2,933,480.

Vulcanization of Copolymer B

Two stocks, A and B, were made according to the recipe of Example 1 except that Copolymer B was substituted for Copolymer A. Stock A, which is outside the scope of the present invention, contained no organic isocyanate and was included for purposes of comparison. After the stocks had been cured in a press for 5 and 15 minutes at 160° C., the vulcanizates obtained exhibited the following properties (measured at 25° C.):

VULCANIZATE PROPERTIES
[Calcined clay loaded ethylene/1,4-hexadiene copolymer]

|  | Stocks | |
|---|---|---|
|  | A (control) | B |
| Cured 5'/160° C.: | | |
| $M_{300}$ (p.s.i.) | 250 | 690 |
| $T_B$ (p.s.i.) | 600 | 1,180 |
| $E_B$ (percent) | 200 | 200 |
| Cured 15'/160° C.: | | |
| $M_{300}$ (p.s.i.) | 530 | 805 |
| $T_B$ (p.s.i.) | 680 | 1,220 |
| $E_B$ (percent) | 170 | 170 |

EXAMPLE 7

Three stocks, A–C, were compounded on a rubber roll mill according to the following recipe:

| Ingredient | A | B | C |
|---|---|---|---|
| Copolymer A of Example 1 | 100 | 100 | 100 |
| Zinc oxide | 5 | 5 | 5 |
| Tetramethyl thiuram monosulfide | 1.5 | 1.5 | 1.5 |
| 2-mercaptobenzothiazole | 2 | 2 | 2 |
| Sulfur | 3 | 3 | 3 |
| Polyisocyanate A of Example 1 | 0 | 3 | 6 |

VULCANIZATE PROPERTIES AT 25° C.
[Calcined clay loaded ethylene/propylene/1,4-hexadiene copolymer]

|  | A | B | C | D | E | F |
|---|---|---|---|---|---|---|
| Isocyanate (3 phr.) | Polyiso A | Tri NCO | None Used | DiCl TDI | TDI Dimer | MDI |
|  | Within Scope LC-690 | | Control | Outside Scope LC-690 | | |
| Cured 5'/160° C.: | | | | | | |
| $M_{300}$ (p.s.i.) | 920 | 905 | 320 | 310 | 370 | 470 |
| $T_B$ (p.s.i.) | 1,290 | 1,430 | 1,655 | 1,890 | 1,700 | 1,750 |
| $E_B$ (percent) | 640 | 655 | 825 | 855 | 905 | 800 |
| Cured 15'/160° C.: | | | | | | |
| $M_{300}$ (p.s.i.) | 915 | 870 | 440 | 400 | 350 | 520 |
| $T_B$ (p.s.i.) | 1,310 | 1,510 | 1,490 | 2,100 | 1,835 | 1,570 |
| $E_B$ (percent) | 550 | 695 | 735 | 770 | 805 | 740 |
| Cured 1'/225 p.s.i. steam: | | | | | | |
| $M_{300}$ (p.s.i.) | 450 | 470 | 230 | 265 | 285 | 355 |
| $T_B$ (p.s.i.) | 1,355 | 1,390 | 1,085 | 1,465 | 1,300 | 1,240 |
| $E_B$ (percent) | 960 | 950 | 975 | 945 | 990 | 930 |
| Cured 3'/225 p.s.i. steam: | | | | | | |
| $M_{300}$ (p.s.i.) | 485 | 515 | 290 | 285 | 400 | 460 |
| $T_B$ (p.s.i.) | 1,550 | 1,455 | 1,420 | 1,510 | 1,510 | 1,550 |
| $E_B$ (percent) | 885 | 875 | 920 | 880 | 930 | 870 |

MDI—methylenebis(4-phenylisocyanate).
Polyiso A—Polyisocyanate A of Example 1.
Tri NCO—5-methyl-2,4,4'-triisocyanato-diphenylmethane.
DiCl TDI—ring dichlorinated toluene-2,4-diisocyanate.
TDI Dimer—toluene-2,4-diisocyanate dimer.

The resulting stocks were cured in a press for 15 minutes at 160° C. The vulcanizates obtained displayed the following properties (measured at 25° C.):

VULCANIZATE PROPERTIES

[Ethylene/propylene/1,4-hexadiene gum stocks]

| Property | A (control) | B | C |
|---|---|---|---|
| $M_{300}$ (p.s.i.) | 235 | 260 | 270 |
| $T_B$ (p.s.i.) | 325 | 420 | 480 |
| $E_B$ (percent) | 395 | 395 | 410 |

This example is outside of the scope of the present invention and illustrates that the polyisocyanate adjuvant effect is not obtained for gum stocks.

EXAMPLE 8

Two stocks, A and B, were compounded on a rubber roll mill at about 75–100° F. according to the following recipe.

Ingredients: Parts by weight
- Copolymer A of Example 1 _____ 100
- Calcined clay of Example 1 _____ 120
- Naphthenic petroleum oil of Example 2 _____ 40
- Zinc oxide _____ 5
- $PbO_2$ _____ 10
- Sulfur _____ 1
- p-Quinone dioxime _____ 3
- Polyisocyanate A of Example 1:
  - (A) _____ 0
  - (B) _____ 3

Portions of the stocks were cured in a press for 5 and 15 minutes at 160° C. Other portions were cured with 225 lb./sq. in. steam for 1 minute and 3 minutes. The table which follows gives the vulcanizate properties as measured at 25° C. The properties for stock A, which is outside the scope of the present invention, are included for purposes of comparison.

QUINOID VULCANIZATE PROPERTIES

[Calcined clay loaded ethylene/propylene/1,4-hexadiene copolymer]

| | A (control) | B |
|---|---|---|
| Polyisocyanate A (phr.) | 0 | 3 |
| Cured 5′/160° C.: | | |
| $M_{300}$ (p.s.i.) | 105 | 390 |
| $T_B$ (p.s.i.) | 200 | 520 |
| $E_B$ (percent) | 940 | 720 |
| Cured 15′/160° C.: | | |
| $M_{300}$ (p.s.i.) | 160 | 400 |
| $T_B$ (p.s.i.) | 360 | 650 |
| $E_B$ (percent) | >1,000 | 620 |
| Cured 1′/225 p.s.i. steam: | | |
| $M_{300}$ (p.s.i.) | 180 | 290 |
| $T_B$ (p.s.i.) | 560 | 600 |
| $E_B$ (percent) | >1,000 | 1,000 |
| Cured 3′/225 p.s.i. steam: | | |
| $M_{300}$ (p.s.i.) | 275 | 360 |
| $T_B$ (p.s.i.) | 950 | 1,070 |
| $E_B$ (percent) | >1,000 | >1,000 |

EXAMPLE 9

Two stocks, A and B, were compounded on a rubber roll mill according to the following recipe.

Ingredients: Parts by weight
- Copolymer A of Example 1 _____ 100
- Zinc oxide _____ 5
- Sterling FT carbon black _____ 50
- Naphthenic petroleum oil of Example 2 _____ 20
- Sulfur _____ 3
- 2-mercaptobenzothiazole _____ 2
- Tetramethyl thiuram monosulfide _____ 1.5
- Polyisocyanate A of Example 1 (stock A only) _ 3

The resulting stocks were cured in a press at 160° C. for 5 and 15 minutes. The table below gives the vulcanizate properties at 25° C. The data for stock B, which is outside the scope of the present invention, are provided for purposes of comparison.

VULCANIZATE PROPERTIES

[FT black loaded ethylene/propylene/1,4-hexadiene copolymer]

| | A | B (control) |
|---|---|---|
| Polyisocyanate A (phr.) | 3 | 0 |
| Cured 3′/160° C.: | | |
| $M_{300}$ (p.s.i.) | 555 | 280 |
| $T_B$ (p.s.i.) | 1,255 | 725 |
| $E_B$ (percent) | 540 | 600 |
| Cured 15′/160° C.: | | |
| $M_{300}$ (p.s.i.) | 630 | 370 |
| $T_B$ (p.s.i.) | 1,105 | 460 |
| $E_B$ (percent) | 450 | 400 |
| Permanent set at break (percent) | 5 | 5 |

EXAMPLE 10

Seven stocks (A–G) were compounded on a rubber roll mill at 75–100° F. according to the following recipe.

Component: Parts by weight
- Copolymer A of Example 1 _____ 100
- Kaolin clay _____ 120
- Naphthenic petroleum oil _____ 40
- Zinc oxide _____ 5
- 2-mercaptobenzothiazole _____ 2
- Tetramethylthiuram monosulfide _____ 1.5
- Sulfur _____ 3
- Isocyanate (see table) (except for control D) _ 3

Promoter:
- A—2,4,4′-triisocyanatodiphenylether
- B—4,4′,4″-triisocyanatotriphenylmethane
- C—Polyisocyanate A of Example 1
- D—None
- E—4,4′-diisocyanatodiphenylmethane
- F—4,4′-diisocyanato-3,3′-dimethyldiphenylmethane
- G—Reaction product of 2 moles of trimethylolpropane, 3 moles of diethyleneglycol, and 10.5 moles of an isomer (80% 2,4-; 20%, 2,6-) mixture of toluene diisocyanate Stocks D–G, which are outside the scope of the present invention, are included for purposes of comparison.

After these compositions had been cured in a press at 160° C. for 5 and 15 minutes, the resulting vulcanizates displayed the following properties:

STOCKS

| | A | B | C | D | E | F | G |
|---|---|---|---|---|---|---|---|
| | Within Scope | | | Control | Outside Scope | | |
| NCO/Promoter Molecule | 3 | 3 | >3 | --------- | 2 | 2 | >2<3 |
| Cured 5′/160° C.: | | | | | | | |
| $M_{300}$ | 1,010 | 1,035 | 890 | 300 | 500 | 450 | 380 |
| $T_B$ | 1,485 | 1,510 | 1,500 | 1,640 | 1,740 | 1,565 | 1,680 |
| $E_B$ | 470 | 525 | 665 | 885 | 900 | 850 | 855 |
| Cured 15′/160° C.: | | | | | | | |
| $M_{300}$ | 1,130 | 1,090 | 840 | 400 | 460 | 400 | 430 |
| $T_B$ | 1,505 | 1,485 | 1,360 | 1,695 | 1,770 | 1,480 | 1,635 |
| $E_B$ | 490 | 480 | 630 | 750 | 850 | 805 | 740 |

EXAMPLE 11

Special copolymer composition

A special copolymer composition was prepared by mixing 100 parts of Copolymer A of Example 1 and 3 parts of Polyisocyanate A on a rubber roll mill at 75–100° F.

Compounding and curing of the special copolymer composition

The special copolymer composition was compounded on a rubber roll mill at 75–100° F. according to the following recipe.

| Ingredients: | Parts by weight |
| --- | --- |
| Special copolymer composition | 103 |
| Zinc oxide | 5 |
| Calcined clay (of Example 1) | 120 |
| Naphthenic petroleum oil (of Example 2) | 40 |
| Sulfur | 3 |
| Tetramethyl thiuram monosulfide | 1.5 |
| 2-mercaptobenzothiazole | 2 |

The resulting stock (A) was cured in a press for 5 and 15 minutes at 160° C. The vulcanizate data are given in the table below.

Controls

For purpose of comparison two control stocks B and C were made. Stock B, corresponding to the present invention, was made by substituting 100 parts of Copolymer A of Example 1 for the 103 parts of the Special Copolymer Composition in the above recipe and finally introducing 3 parts of Polyisocyanate A. Stock C, outside the scope of the present invention, was made like B except that no Polyisocyanate A was added. Stocks B and C were cured in the same way as stock A. The vulcanizate data are given in the table below.

VULCANIZATE PROPERTIES

[Calcined clay loaded ethylene/propylene/1,4-hexadiene copolymer]

| | Stock A | Control Stock B | Conventional Control Stock C |
| --- | --- | --- | --- |
| Polyisocyanate A | Present | Present | Absent |
| Cured 5'/160° C.: | | | |
| $M_{300}$ (p.s.i.) | 745 | 755 | 270 |
| $T_B$ (p.s.i.) | 1,260 | 1,285 | 1,310 |
| $E_B$ (percent) | 675 | 675 | 835 |
| Cured 15'/160° C.: | | | |
| $M_{3000}$ (p.s.i.) | 760 | 885 | 380 |
| $T_B$ (p.s.i.) | 1,135 | 1,240 | 1,440 |
| $E_B$ (percent) | 590 | 550 | 730 |

As many widely different embodiments of this invention may be made without departing from the spirit and scope thereof, it is to be understood that this invention is not limited to the specific embodiments thereof except as defined in the appended claims.

What is claimed is:

1. A composition consisting essentially of a normally solid copolymer of at least one α-monoolefin having the structure $R-CH=CH_2$, where R is H or $C_1$ to $C_{16}$ alkyl, and at least one non-conjugated diene, from 20 to 300 parts by weight per 100 parts by weight of said copolymer of a reinforcing material selected from the group consisting of mineral filler and carbon black, a curing system selected from sulfur and quinoid curing systems and at least 0.5 part per hundred parts by weight of said copolymer of an organic isocyanate containing at least three isocyanate groups each isocyanate group being directly attached to an aromatic nucleus.

2. The composition of claim 1 wherein from 2 to 3 parts by weight of said organic isocyanate is present per 100 parts by weight of said copolymer.

3. The composition of claim 1, wherein said copolymer is ethylene/propylene/1,4-hexadiene.

4. The composition of claim 1, wherein said copolymer is ethylene/propylene/dicyclopentadiene.

5. The composition of claim 1, wherein said copolymer is ethylene/1,4-hexadiene.

6. The composition of claim 1, wherein said organic isocyanate is of the formula $$OCN-R-(CH_2-R')CH_2-R-NCO$$

wherein R is phenylene and R' is phenylene substituted by an —NCO group.

7. A process for increasing the cure rate of composition consisting essentially of a normally solid copolymer of at least one α-olefin having the structure $R-CH=CH_2$ wherein R is H or $C_1$ to $C_{16}$ alkyl and at least one non-conjugated diene, from 20 to 300 parts by weight per 100 parts by weight of said copolymer of a reinforcing material selected from the group consisting of mineral filler and carbon black, and a curing system selected from sulfur and quinoid curing systems which process consists of curing said composition in the presence of at least 0.5 part by weight per 100 parts of said copolymer of an organic isocyanate having at least three isocyanate groups each isocyanate group being directly attached to an aromatic nucleus.

8. A vulcanizate prepared according to the process of claim 7.

9. Process of claim 7 wherein said isocyanate is present in an amount of from 2 to 3 parts by weight per 100 parts by weight of said copolymer.

References Cited

UNITED STATES PATENTS

| 2,933,480 | 4/1960 | Gresham et al. | |
| 3,012,020 | 12/1961 | Kirk et al. | 260—41 |
| 3,084,141 | 4/1963 | Kraus et al. | 260—81.5 |

MORRIS LIEBMAN, *Primary Examiner.*

A. LIEBERMAN, *Assistant Examiner.*